(12) United States Patent
Carre et al.

(10) Patent No.: US 10,127,724 B2
(45) Date of Patent: Nov. 13, 2018

(54) SYSTEM AND METHOD FOR PROVIDING AUGMENTED REALITY ON MOBILE DEVICES

(71) Applicants: Guillaume Carre, Vaucresson (FR); Alain Mutricy, San Francisco, CA (US)

(72) Inventors: Guillaume Carre, Vaucresson (FR); Alain Mutricy, San Francisco, CA (US)

(73) Assignee: Vuezr, Inc., San Francisco, CA (US)

( * ) Notice: Subject to any disclaimer, the term of this patent is extended or adjusted under 35 U.S.C. 154(b) by 33 days.

(21) Appl. No.: 14/759,093

(22) PCT Filed: Jan. 6, 2014

(86) PCT No.: PCT/US2014/010379
§ 371 (c)(1),
(2) Date: Jul. 2, 2015

(87) PCT Pub. No.: WO2014/107681
PCT Pub. Date: Jul. 10, 2014

(65) Prior Publication Data
US 2015/0348329 A1 Dec. 3, 2015

Related U.S. Application Data

(60) Provisional application No. 61/749,230, filed on Jan. 4, 2013.

(51) Int. Cl.
*G09G 5/00* (2006.01)
*G06T 19/00* (2011.01)
(Continued)

(52) U.S. Cl.
CPC ........ *G06T 19/006* (2013.01); *G06F 3/04815* (2013.01); *G06F 17/3028* (2013.01); *G06F 17/30879* (2013.01); *G06K 9/00671* (2013.01); *G06K 9/18* (2013.01); *G06K 9/3266* (2013.01); *G06Q 30/02* (2013.01); *G06Q 30/06* (2013.01); *H04N 5/23293* (2013.01); *H04N 5/272* (2013.01); *H04N 5/44* (2013.01); *H04N 21/25841* (2013.01); *H04N 21/25858* (2013.01); *H04N 21/41407* (2013.01);
(Continued)

(58) Field of Classification Search
USPC .......................................... 345/631–633, 473
See application file for complete search history.

(56) References Cited

U.S. PATENT DOCUMENTS 8,433,722 B2 * 4/2013 Shin .................... G06F 17/3087
345/633
8,576,276 B2 * 11/2013 Bar-Zeev ............. G02B 27/017
345/8

(Continued)

*Primary Examiner* — Ryan R Yang
(74) *Attorney, Agent, or Firm* — Steptoe & Johnson LLP

(57) ABSTRACT

A system and method for providing augmented reality on a mobile device is herein disclosed. According to one embodiment, the computer-implemented method includes providing a targeting advice area in a camera preview of an application running on a user device and recognizing a target using the targeting advice area. The computer-implemented method further provides an event via the camera preview based on a target recognition.

24 Claims, 7 Drawing Sheets

(51) Int. Cl.
| | | |
|---|---|---|
| H04N 5/232 | (2006.01) | |
| G06K 9/18 | (2006.01) | |
| G06F 17/30 | (2006.01) | |
| H04N 5/44 | (2011.01) | |
| G06Q 30/02 | (2012.01) | |
| G06K 9/00 | (2006.01) | |
| G06Q 30/06 | (2012.01) | |
| G06K 9/32 | (2006.01) | |
| H04N 5/272 | (2006.01) | |
| G06F 3/0481 | (2013.01) | |
| H04N 21/258 | (2011.01) | |
| H04N 21/414 | (2011.01) | |
| H04N 21/422 | (2011.01) | |
| H04N 21/4223 | (2011.01) | |
| H04N 21/431 | (2011.01) | |
| H04N 21/435 | (2011.01) | |
| H04N 21/443 | (2011.01) | |
| H04N 21/45 | (2011.01) | |
| H04N 21/472 | (2011.01) | |
| H04N 21/4722 | (2011.01) | |
| H04N 21/478 | (2011.01) | |
| H04N 21/4782 | (2011.01) | |
| H04N 21/4784 | (2011.01) | |
| H04N 21/4786 | (2011.01) | |
| H04N 21/4788 | (2011.01) | |
| H04N 21/61 | (2011.01) | |
| H04N 21/6547 | (2011.01) | |
| H04N 21/658 | (2011.01) | |
| H04N 21/81 | (2011.01) | |
| H04N 21/858 | (2011.01) | |
| H04N 21/426 | (2011.01) | |

(52) U.S. Cl.
CPC ... H04N 21/4223 (2013.01); H04N 21/42202 (2013.01); H04N 21/431 (2013.01); H04N 21/435 (2013.01); H04N 21/443 (2013.01); H04N 21/4524 (2013.01); H04N 21/472 (2013.01); H04N 21/4722 (2013.01); H04N 21/4782 (2013.01); H04N 21/4784 (2013.01); H04N 21/4786 (2013.01); H04N 21/4788 (2013.01); H04N 21/47805 (2013.01); H04N 21/47815 (2013.01); H04N 21/6125 (2013.01); H04N 21/6175 (2013.01); H04N 21/6547 (2013.01); H04N 21/6581 (2013.01); H04N 21/6582 (2013.01); H04N 21/812 (2013.01); H04N 21/816 (2013.01); H04N 21/8186 (2013.01); H04N 21/8586 (2013.01); *G06K 2009/3225* (2013.01); *H04N 21/42684* (2013.01)

(56) References Cited

U.S. PATENT DOCUMENTS

| | | | |
|---|---|---|---|
| 8,624,725 B1* | 1/2014 | MacGregor | H04W 4/029 340/539.13 |
| 2005/0035980 A1* | 2/2005 | Lonsing | G06T 15/00 345/633 |
| 2005/0193018 A1* | 9/2005 | Rosdahl | G06K 9/2054 |
| 2010/0120450 A1* | 5/2010 | Herz | H04M 3/42348 455/456.3 |
| 2011/0129118 A1* | 6/2011 | Hagbi | G06T 19/006 382/103 |
| 2011/0157179 A1* | 6/2011 | Fahn | G06T 19/006 345/427 |
| 2012/0069050 A1* | 3/2012 | Park | G06F 3/04883 345/632 |
| 2012/0092328 A1* | 4/2012 | Flaks | G02B 27/017 345/419 |
| 2012/0105473 A1* | 5/2012 | Bar-Zeev | G02B 27/017 345/633 |
| 2012/0113092 A1* | 5/2012 | Bar-Zeev | G02B 27/017 345/419 |
| 2013/0038601 A1* | 2/2013 | Han | G06T 13/40 345/419 |
| 2013/0076790 A1* | 3/2013 | Lefevre | G06T 7/20 345/633 |
| 2014/0078174 A1* | 3/2014 | Williams | G06T 19/006 345/633 |
| 2015/0018057 A1* | 1/2015 | Carter | F41G 3/26 463/2 |
| 2016/0026869 A1* | 1/2016 | Rekimoto | G06T 19/006 345/633 |

* cited by examiner

SYSTEM AND METHOD FOR PROVIDING AUGMENTED REALITY ON MOBILE DEVICES

CLAIM OF PRIORITY

The present application claims the benefit under 35 USC 371 to International Application No. PCT/US2014/010379, filed Jan. 6, 2014, which claims priority to U.S. Provisional Patent Application Ser. No. 61/749,230 filed on Jan. 4, 2013, each of which is hereby incorporated by reference.

FIELD

The present disclosure relates in general to the field of computer software and systems, and in particular, to a system and method for providing augmented reality to a mobile device, leveraging contextual information and a uniform resource identifier (URI) (e.g., uniform resource locator (URL)) redirection.

BACKGROUND

A mobile device with an embedded camera and Internet access can scan a computer code or an optical machine-readable tag and access content associated with the computer code or be directed to additional information via the Internet. An application running on the mobile device facilitates scanning and decoding of computer codes and communicates with a remote server to access content associated with the scanned computer code. A QR code is a two-dimensional (2D) code that uses black and white graphic elements arranged in a matrix form. The black and white graphic elements contain binary information that corresponds with the geometry of the QR code and is scanned by a scanning device for automatic identification. Black and white QR codes are most popular but colored QR codes can replace black and white QR codes.

With recent advancements in the Internet and wireless communication technology, the delivery of content over a user device such as a mobile phone or a tablet personal computer (PC) has become more efficient and user friendly. Applications running on a user device support various functionalities and features to provide an enhanced user experience.

Augmented reality (AR) has emerged as an innovative tool that allows a brand to interact with consumers on a mobile device. By integrating recommendation technologies, location-based services, and social network components, AR provides a dynamic and engaging user experience that enriches the relationship between consumers and a brand. Packaging materials, print advertisements, promotional posters and TV shows are increasingly using digital media and AR to complement or augment a user experience with a brand or a product that they promote. Augmented reality also allows mobile users to create their own content and share their content with other users and interact with other users, objects, products, pieces of art, popular icons, brands, brand logos, monuments, buildings, landmarks, or specific scenery in more interactive and engaging ways.

SUMMARY

A system and method for providing augmented reality on a mobile device is herein disclosed. According to one embodiment, the computer-implemented method includes providing a targeting advice area in a camera preview of an application running on a user device and recognizing a target using the targeting advice area. The computer-implemented method further provides an event via the camera preview based on a target recognition.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1A:
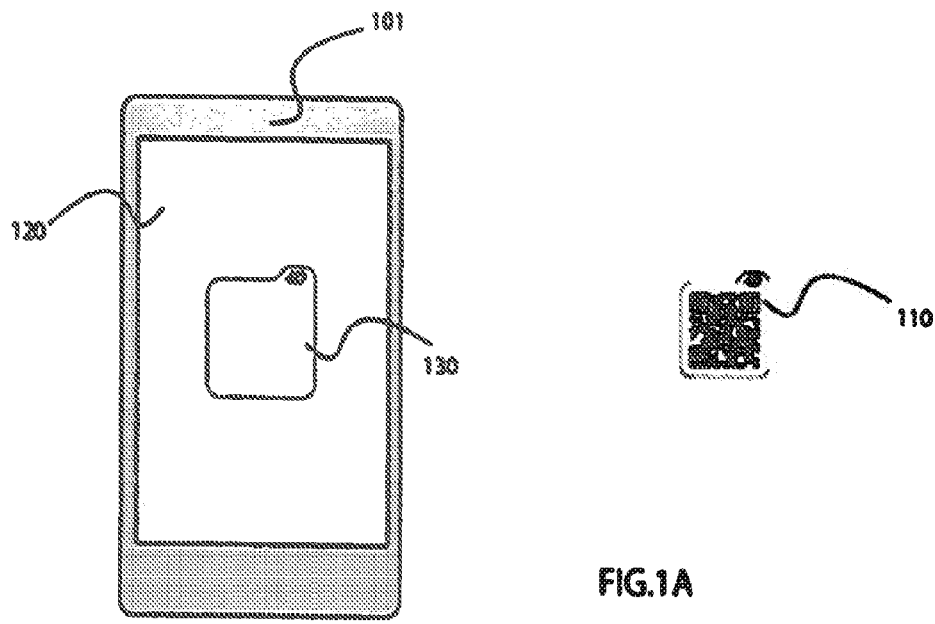
FIG. 1A illustrates an exemplary portable device for scanning a QR code, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A system and method for providing augmented reality on a mobile device is herein disclosed. According to one embodiment, the computer-implemented method includes providing a targeting advice area in a camera preview of an application running on a user device and recognizing a target using the targeting advice area. The computer-implemented method further provides an event via the camera preview based on a target recognition.

An augmented reality is provided to a user on a mobile device by scanning a quick response code or redirecting to a uniform resource identifier (URI) associated with a target in the real world. The URI (e.g., uniform resource locator (URL)) redirection is equivalent to a QR code scanning and accelerates the recognition of a real scene and facilitates the execution of an augmented reality session.

Each of the features and teachings disclosed herein can be utilized separately or in conjunction with other features and teachings to provide a system and method for combining past user events with real-time user events to rapidly respond to advertising opportunities. Representative examples utilizing many of these additional features and teachings, both separately and in combination are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The steps are not intended to be performed in a specific sequential manner unless specifically designated as such.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein, such as but not limited to a smartphone. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or processes presented herein are not inherently related to any particular computer or other apparatus. Various general purpose systems, computer servers, or personal computers may be used with programs in accordance with the teachings herein, or it may prove convenient to construct a more specialized apparatus to perform the method steps. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure. It is also expressly noted that the dimensions and the shapes of the components shown in the figures are designed to help to understand how the present teachings are practiced, but not intended to limit the dimensions and the shapes shown in the examples.

URL redirection refers to an action that directs an application running on a device (e.g., a smartphone, and a tablet PC) to a URL (or URI) after a user interacts with the application, for instance, scanning a QR code, or selecting an image in a library. The present system and method is related to an application based on a quick response (QR) code but may be applicable to any type of computer code. Examples of computer codes include, but are not limited to, a bar code, a matrix code, any 2D code such as a flash code, a data matrix code, a QR code, a MICROSOFT® code, and a proprietary code. In one embodiment, a proprietary code is a bi-color code that reduces an RGB sensor capture time by using blue and white colors for the B channel). In another embodiment, a proprietary code uses different geometrical dimensions of squares. The present system and method concerns various devices including smart phones, tablet computers, augmented reality glasses such as Google AR glasses, IPODs™, and other portable devices such as wearable devices with video recording and scanning functionalities that operate on various operating systems (e.g., ANDROID®, IOS®, OSX®, UNIX®, MICROSOFT WINDOWS®, WINDOWS MOBILE®, LINUX®, or the like, and any branch/derivative thereof, BAIDU, BLACKBERRY OS or KINDLE OS).

According to one embodiment, the present system and method associates a QR code with an augmented reality (AR) event. The present system and method scans a QR code with a camera of a mobile device, sends the information associated with the QR code to a server, and feeds data, video, and/or live streaming from the server to the mobile device. In one embodiment, the present system and method uses the URI redirection information of a QR code embedded in the application instead of scanning a QR code. The data, video and/or live streaming sent back to the mobile device augment a camera preview on the mobile device, and prompts the user to take one or more actions.

According to one embodiment, a user uses a portable wireless device to scan a QR code. Examples of a portable wireless device include, but are not limited to, a smart phone and a tablet PC, as well as AR glasses. The portable wireless device has a scanning functionality such as an embedded camera. The user opens a native application (e.g., SCAN 2.0™, MOBILETAG®, GOOGLE GOGGLES®, QR DROID®) or a downloaded application in the portable wireless device. In one embodiment, after a QR code is scanned using a native application, the user is prompted to download an AR application that is appropriate for the operating system of the device. When the user sees a QR code and launches the application on the device, the camera preview (also referred to as a preview of the camera optical flow) from the device is displayed on the screen of the device. The application has a QR code scanning area (or targeting advice) in the camera preview for the user to scan the QR code.

FIG. 1A illustrates an exemplary portable device for scanning a QR code, according to one embodiment. The device 101 may be a smart phone or a tablet PC or AR glasses having a screen 120. When a user runs an augmented reality application for scanning a QR code, a camera preview with a targeting advice area 130 is shown on the screen 120. The user aims the camera of the device 101 at a QR code 110 to capture and scan the QR code 110 within the targeting advice area 130.

According to one embodiment, the present system and method generates a QR code with a URL for providing an augmented reality event. The QR code may be provided to the user in many alternative ways, either visible in the real world (e.g., on an advertising panel, a print material, a video, a package, an object, a label) or not immediately visible (e.g., attached or embedded in to a digital media, an application, a web page, an object list).

The user may be notified of a presence of an augmented reality event either by a sign or a notification in the real world surrounding the user, or via a digital notification on the screen 120 of the device 101. The digital notification may be provided based on the user's geo-location (e.g., via a global positioning system (GPS), Wi-Fi data, Bluetooth low energy (BTLE) data, RFID or NFC tagging, audio signal scanning), received by a message (e.g., an SMS message, an email, a social network message, a notification), or triggered by the application if the application is open or in a "wake-mode" in the OS background of the device 101.

A notification may include, for instance, a picture of an element of the real world surrounding the user, herein referred to as a live target, and a non-visible QR code. If the user interacts (e.g., clicking or selecting on a button), the application launches a camera preview, and sends to the server the QR code information as if the user has scanned a QR code. The server recognizes the QR code and sends information back to the device 101. The information that the server sends to the device 101 includes, for instance, an Augmented Reality Event, and a ghost image to be displayed in a transparency layer of the camera preview on the display 120 to guide the user to the next step in the augmented reality application so the ARE can be executed. In case when the ghost image is sent to the device 101 via a notification, the ghost image may be already available, therefore the server does not need to resend the ghost image to the device 101.

If the QR code is visible to the user, the user starts the application to experience the augmented reality event by scanning the QR code. Once the application scans a QR code that is recognized by the server, the application displays a ghost image or a message in a transparency layer of a camera preview on the display 120 to guide the user to the next step in the augmented reality application.

According to one embodiment, after the device 101 scans the QR code 110, the device 101 makes a web request (e.g., over http, json or else) to a server if the device 101 recognizes the server in the URL. If the device 101 does not recognize the URL, the application launches a browser on the device 101, and provides the user an instruction to proceed with the URI of the QR code 110 as per standard QR code event management. When making a web request, the device 101 sends its identification information to the server and requests the server to send data associated with the URL of the QR code 110. The server determines whether the QR code 110 is recognizable by looking up a record of URLs. If the URL is recognized by the server, the server sends the associated content to the device 101. If the server cannot identify the associated content, the server sends an error message to the device 101.

Figure 1B:
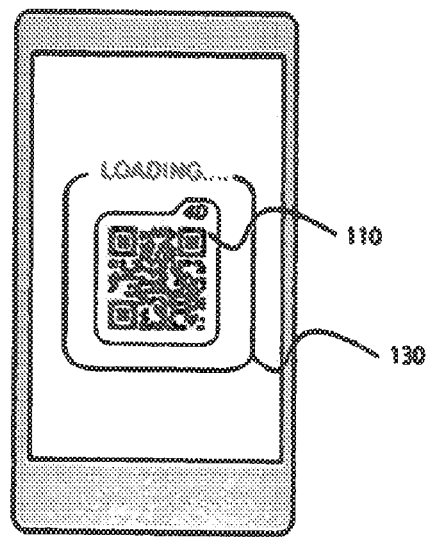
FIG. 1B illustrates an exemplary application for scanning a QR code, according to one embodiment.

FIG. 1B illustrates an exemplary application for scanning a QR code, according to one embodiment. The application scans the QR code 110 when the QR code 110 is placed within the targeting advice area 130. The QR code 110 recognized by the server contains a URL address of a content, for example, a video clip or a streaming video. The video content returned by the server provides the user with augmented reality in the camera preview. The content associated with the QR code 110 may be, but is not limited to, an audio, a video, a movie, and an AR video. The video content may contain multiple frames, a still image or a three-dimensional (3D) content. The content associated with the QR code might also include a transparent user interface that proposes one or more choices of actions or provides actionable buttons to the user (e.g., clicking one or more buttons on the user interface) during or after the AR session The user interface may be specific to a QR code session or the user's location.

According to one embodiment, the present system and method provides content embedded in a URL of a QR code. Examples of content embedded in a URL includes, but are not limited to: (1) an AR video, (2) a transparency video (e.g., a green chromakey, a chromakey movie, and a left mask transparency such as an alpha left and an alpha movie) displayed in a transparency layer of a camera preview to provide an augmented reality event over a real scene that is being captured by the camera preview, (3) data associated with an Augmented Reality Event (ARE) including data for the application to interact with the user (e.g., a video, an audio, an instruction for a user action, a website, a URL, a message, a telephone number to call, a logo, marketing material, a coupon, a purchase order form, and a payment form or a link to a payment transaction application), (4) a number of AR video chunks specific to the device, (5) an audio stream, (6) a scenario that defines what content to provide to the device 101 depending on specific user or location information (e.g., device ID or device location, previous user experience).

Figure 1C:
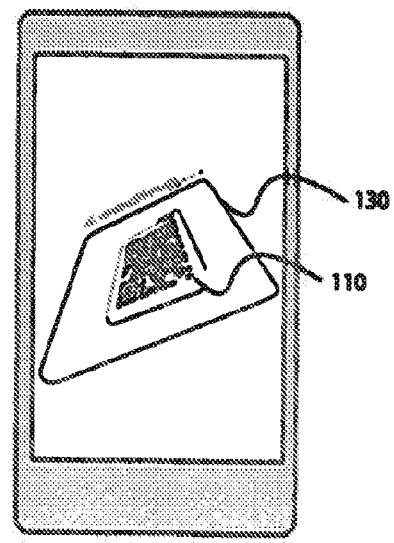
FIG. 1C illustrates an orientation change of a real scene during a scan of a QR code, according to one embodiment.

According to one embodiment, when the QR code is scanned by the device and QR code information is transmitted from the device to the server, the application displays a message or an advice area to instruct the user to focus on the QR code while subsequent data is being downloaded to the device from the server. The message may continue to be displayed until an event occurs. Examples of an event include, but are not limited to, a completion of a download, an expiration of a timer, and a user's action. The message may be displayed on the same geometrical surface (or relative to the geometrical surface) as the QR code. FIG. 1C illustrates an orientation change of a real scene during a scan of a QR code, according to one embodiment. When the user moves or changes the orientation of the device, the camera preview shows the updated real scene with the updated position, scaling and orientation of the QR code 110 in real-time based on the coordinate registration between the targeting advice area 130 and the scanned QR code 110.

Figure 2:
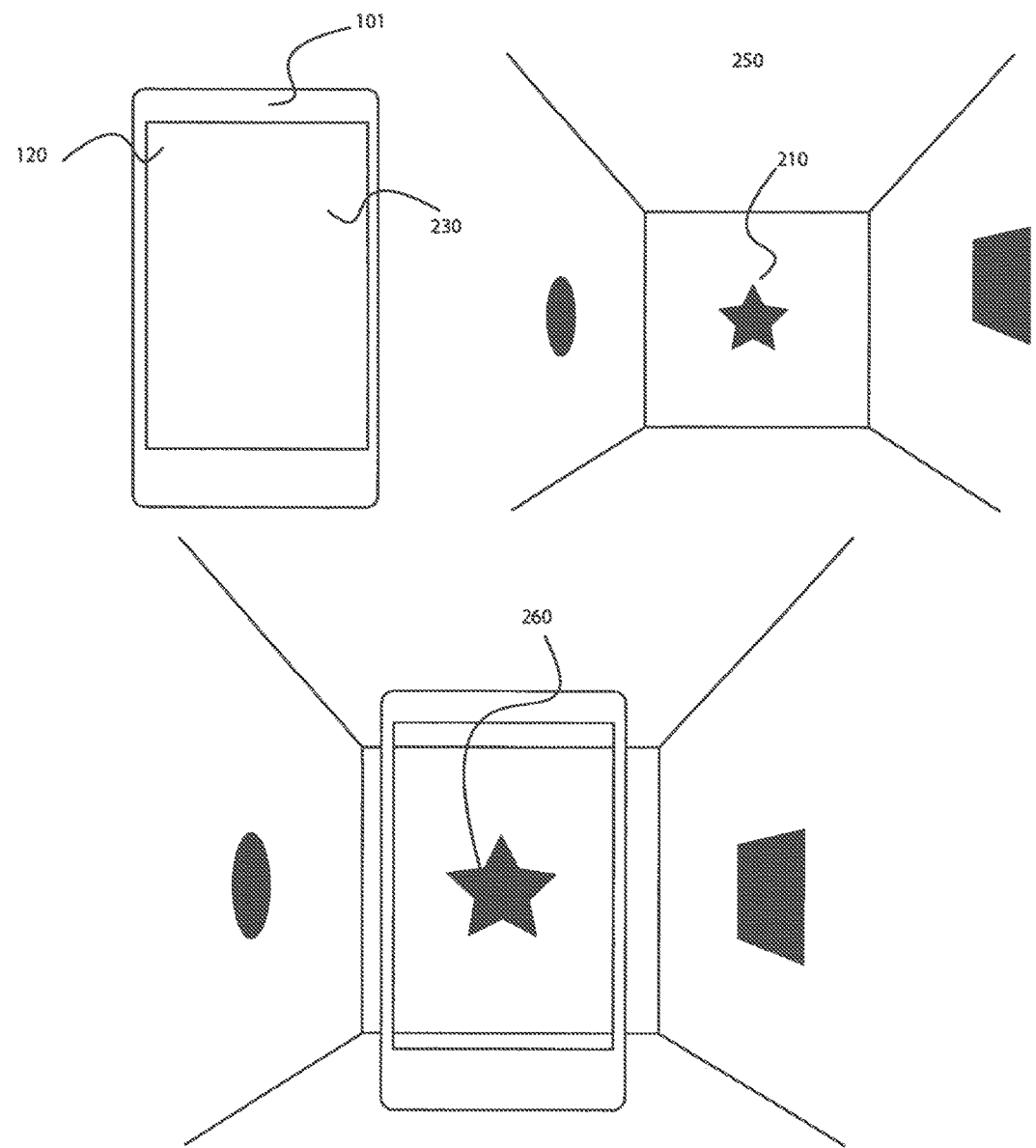
FIG. 2 illustrates an exemplary live target superposed with a ghost image, according to one embodiment.

FIG. 2 illustrates an exemplary live target superposed with a ghost image, according to one embodiment. A user runs an application on the device 101. After sending a request to the URL on the server, the application shows a camera preview with a ghost image 230 on the screen 120. The URL contains an Augmented Reality Event scenario and data. The application starts downloading or streaming the content of the Augmented Reality Event in the background that is not visible to the user until a reference image registration. The user aims the camera of the device 101 at a live target 210 of a real scene 250 to capture the live target 210 within the ghost image 230. The user intuitively superposes the ghost image 230 with the live target 210. In parallel, the application attempts to match the reference image 260 sent from the URL (not visible to the user) with the live target 210 in the camera processing flow. The ghost image 230 directs the user to aim at the right target in the real scene 250 in the camera preview to facilitate the matching. Once the application matches the reference image 260 with the live target 210 in the camera processing flow, the application completes the "reference image registration" and delivers augmented reality event content (including but is not limited to a video) in the camera preview for the user.

The present system and method provides a set of data that is included in the embedded URL of a QR code. Examples of such data include, but are not limited to, (1) an image to create object images, (2) an AR video URL, (3) a set of 3D coordinates relative to the reference image of an AR video, (4) a set of 3D coordinates of an AR video, (5) the type of AR video transparency, (6) an augmented reality event (ARE) and scenario, (7) a number of AR video chunks, (8) a 3D object with texture and its moving scenarios, and (9) a transparent layer of an additional user interface option for the user.

According to one embodiment, for each live target to be recognized, the application on the device 101 analyzes multiple images. For example, for a given augmented reality session, three object images are provided including a ghost image, a reference image, and a target image. The server may send the ghost image and the reference image as 2 separate sets of data. The ghost image is overlaid in the camera preview of the application to guide the user to identify an object to aim. Examples of a ghost image include, but are not limited to, a transparent image of the live target or a subset of it, an outline of an object, a silhouette, and a local environment view (e.g., a room, a building, a street, a mall, a landmark, a landscape). The application guides the user to aim the camera of the device at a real representation of the ghost image and to superpose the preview of the real object with the ghost image. The reference image is a description of the live target image in the real environment as seen through the camera preview. The reference image provides a reference for the application. The reference image may be a mathematical description of the image represented by the ghost image or a digital image file.

In one embodiment, the reference image is internal to the application and is not visible by the user. The target image is a captured image of a real object or an image or an environment captured within the camera preview that the application recognizes by comparing the reference image data with the captured image in the camera preview. The target image provides data of a real object and gives the positioning of a photographed image in the real scene of the reference image. If the ghost image is not a sign or an instruction, it is a semi-transparent picture that is a subset or a superset of the target image in the real scene. There may be multiple target images and multiple application-embedded URLs associated to the target images in an augmented reality session scenario. In that case, each of the target images is associated with its own corresponding ghost image and reference image within the application. The registration of the reference image (recognized within the target image—or target image lock—in the real scene in the camera preview) triggers the corresponding URL-based event.

A URL of an AR video is the URL from which the application streams a video of the augmented reality event. The URL of an AR video may include only an audio stream. The URL of an AR video may include an AR 3D content URL (e.g., a URL from which the application downloads the 3D content), an AR 3D scenario (e.g., a URL from which the application downloads the behavior of the 3D content). For instance, the AR 3D content is an animated character. The AR 3D scenario defines behaviors of the animated character (e.g., how it moves, what it says) based on the user's interaction with the device such as the live target that the user aims at in the real scene, the selection of a button on the application transparent user interface layer, a voice command, and the motion tracking of the device.

The application is capable of recognizing a live target at various distances within a certain range depending on the size of the live target in the camera processing flow. Once the reference image is registered, the plane and size of the live target image compared to the reference image in the camera processing flow are used to determine the projection plane and size of the AR content (for instance but not limited to AR video). A set of 3D coordinates provides a relative position and orientation to the reference image (xv, yv, zv) (e.g., the bottom left corner of the target image 601) of the AR video 701. The 3D coordinates are used to position the AR video relative to the reference image. Another set of 3D coordinates (xv, yv, zv) (e.g., the top left corner of the AR video) of the AR video is used to position the AR video relative to the QR code position in the scene of the camera preview as an alternate position method when a QR code is present in the real scene.

According to one embodiment, the present system and method provides various types of AR video transparency. For example, a green chromakey is used to display a chromakey movie where the application replaces all green pixels of the movie by transparency. In another example, left mask transparency (e.g., alpha left) is used to create an alpha movie where the black to white mask embedded on the left of the movie is assembled on the fly in the device 101 to display the movie with its transparency.

An augmented reality event (ARE) associates data for the application to interact with a user (e.g., a video, an audio, an instruction for a user action, a website, a URL, a message, a telephone number to call, a logo, marketing material, a coupon, a purchase order form, and a payment form or a link to a payment transaction application). A number of AR video chunks that are specific to the operating system (OS) of the device are provided to the user during the augmented reality event. The number of AR video chunks is determined by the time (e.g., 1 chunk every 2 seconds, 5 chunks for a 10 second movie), according to one embodiment. This enables the application to determine when to stop downloading the AR video and loop the downloaded AR video. The provision of multiple AR video chunks is suitable for multiple OS'es, particularly IOS®.

According to one embodiment, the present system and method provides a 3D object with texture and a moving scenario. The scenario refers to a set of multiple possible behaviors that changes depending on user influence, or as a result of any combination of sensor data, web data, and/or randomly as a pre-set option.

According to one embodiment, the user aims the device by superposing the ghost image with the live target. The application compares the reference image with a scan of the real object as captured in the camera flow until the object and its position in the real scene are recognized. The plane and size of the live target image compared to the reference image in the camera processing flow are used to determine the projection plane and size of the AR content (e.g., an AR video). The application receives a positive target image lock acknowledgement when the reference image is matched in the camera processing flow with the live target. This acknowledgement is referred to as a registration event. The application launches the AR video at the coordinates (xv, yv, zv) to display the virtual reality video in the camera preview relative to the reference image. The application positions the video projection relative to the target image in the display using the coordinates (xv, yv, zv) and runs the video or streams the video from the server.

According to one embodiment, the application may not use a ghost image and a set of reference images to identify the real environment. In this case, the target projection area (or the projection advice area) is defined differently. In one embodiment, the application may use a set of 3D coordinates of the AR video relative to a QR code position, to define an area within the camera preview to project the AR video. In another embodiment, the ghost image is a sign or a text, and the reference image matching with a target image is triggered and assisted based on the user's location (e.g., via GPS, Wi-Fi, BTLE, RFID or NEC tagging, audio signal), an event (e.g., a timing within a certain geographic sector), or the motion tracking of the device using a sensor or a combination of sensors embedded in the device (e.g., an accelerometer, an e-compass). The user opens the application via a QR code scan (or a URL redirect), or following a notification shown on the device. If an ARE event includes multiple ghost images, the application does not need a new QR code scan. The user may select a desired target image from a list of target images, or a desired ghost image from multiple ghost images. When the user selects a desired target image or a ghost image in the list on the device, the application requests from the server the information that is associated with the selected image on the server as if the application had scanned the corresponding QR code.

If a location service is enabled for the application (e.g., using a GPS, or using a location identification technique based on Wi-Fi, BTLE, RFID or NFC tagging, or audio signal), the application may determine an ARE event that is promoted in the user location, and the server sends ghost images and their associated embedded URLs to the application as if a QR code had been scanned, and provides a notification to the user.

According to one embodiment, the application uses the ARE data to modify the user interface over the camera preview and create user interaction during and/or after video projection. The ARE data may fill up dedicated areas, or be displayed anywhere on the screen. The ARE data may be displayed and used as triggers or buttons to launch a function or a dedicated augmented content. The user may interact with the augmented content by selecting a button and providing an input in a field, such as, but not limited to, posting a comment, reporting an offensive content, voting (e.g., using a star or like system), and sharing the reference image through an email or a social network web site.

An application session stops when the user quits the application on the device. Before the application shuts down, the application collects authorized data related to the user and the user's behavior during the application session. The user's behavior may include, but is not limited to, connection to the Internet, a type, date and time, and the frequency of an application that the user runs on the user's device. The application sends to the server a subset of the trace of the user interaction (e.g., a localization, a type of device, time spent on each augmented content, an action taken, an application version, a number of views of the content, concurrent browsing and search activity on the device, and sensor data during the session) with the device. If the user does not stop the application but either quits or closes the image preview on the camera preview, or takes a proposed action from the application, or simply switches to another application in the phone, the application continues to operate in a background mode, such as waking-up by a call from the OS, the server, or another application, and recording a log of data if the application cannot communicate with the server at the end of the session.

User Interface Ergonomics for Augmented Reality

The present system and method provides user interface ergonomics for augmented reality, according to one embodiment. A ghost image is displayed in a transparency layer to guide the user in positioning the device in space and aiming the camera of the device to the desired part of the real scene for experiencing an AR event. The present system and method guides the user to look at a specified area, using a ghost image in the transparency layer of the camera preview in the device. This ghost image may include an image of a 2D code, or an image of a real scene, a sign, a text or a symbol that is displayed in one or several transparency layers on the camera preview of the device.

According to one embodiment, when the user launches the application on the device, the application opens the camera preview on the device. After the device sends triggers to the server wirelessly that the augmented reality (AR) session is ready to be started, the server may send an image (e.g., a ghost image) to the application on the device. The ghost image may be an outline of a QR code to indicate to the user to aim at. The ghost image may be directly tied to a live target in the real scene. The server may send a set of indications for the user to follow if the application identifies the AR event that is available to the user at the time and location, or based on a notification received by the user (for instance but is not limited to an SMS message, an email, a social network message, a notification service from the OS). The ghost image may be provided by the notification instead of being sent by the server.

The application displays a ghost image in a transparency layer to superpose a scanned image of a real object. The user aims the camera of the device to superpose the ghost image with the live image of the real object. The ghost image represents an indication for the user to follow, for example, an indication to change the device's direction and/or position, and an indication to initiate a user's change of position in the scene. The ghost image may be a QR code contour that incites the user to aim the camera of the device to scan the QR code in the real scene. According to one embodiment, the application scans the QR code first. If the ghost image is a still image of the real scene near the QR code location, the user has an intuitive task to aim the device to superpose the real scene with the ghost image. Other examples of user interface suggestions include, but are not limited to, directions (e.g., an arrow), symbols, text, pictures, diagrams, movies, and maps. The application constantly scans the image of the real scene extracted from the camera application and compares it with a model associated with the ghost image, for example, a reference image. The server may send the ghost image to the application. The model may be a description of the target image or a set of data independent of the target image (e.g., a GPS position data, Wi-Fi data, BTLE data, RFID or NFC data, audio signal, e-compass data, and/or motion tracking based on an accelerometer signal and/or a gyroscope signal). The ghost image (if there is one) is used to guide the user in positioning and aiming the device or to indicate that the user is in the right space and/or in the right direction to receive the associated augmented reality event. In one embodiment, the user starts the application and selects an event from the most liked or most viewed list by clicking on a picture of the target image. The application opens a camera preview and requests the server from the associated URL (as if the corresponding QR code sign is scanned) to start an augmented reality session.

When the application determines that the user is aiming at the right scene, the application starts an AR event. In one embodiment, the present system and method may be used to provide augmented reality over a real scene, a print material, or a video event. In another embodiment, the present system and method is used for advertising or for an in-store or in-mall direction application. In yet another embodiment, the present system and method is used over art pieces (e.g., a painting and a photography) and augment it with content when the user seeks a special detail. In yet another embodiment, the present system and method is used over a product and provides a user's manual for a product or installation or customer service assistance. In yet another embodiment, the present system and method provides a consumer with usability content or entertainment/creative animation on an object or a brand logo and the ability to provide reviews. In yet another embodiment the present system and method enables consumers to create their own content, entertainment/creative animation on an object or a brand logo, or a landmark, or scenery. In yet another embodiment, the present system and method provides animation on tickets at a public event. In yet another embodiment, the present system and method provides an augment event for a sport event by providing an advertisement, a sponsored replay video, a key personality interview, pre-during-post event. In yet another embodiment, the present system and method provides an augment event for a medical congress by providing a sponsored message over a ticket, reminding an agenda, providing a speaker's bios, an advertising key demo, and an entertainment capability.

According to one embodiment, the ghost image is downloaded during an application update so that the ghost image resides in the device, and the application locally manages the ghost image. The ghost image may be provided in real-time to the device when the ghost image is downloaded from the server by the application. The ghost image may be provided or updated using a device input (e.g., GPS data, Wi-Fi or BTLE based location coordinates, e-compass data, gyroscope data, sensor/processor feedback data, a color pattern, a QR code, and near images). The ghost image may be received via social networks, messaging, email, or any other application that enables sharing. According to one embodiment, the application downloads the augmented Reality session content at a URL. At this URL, the content may change depending on the data embedded with the requested URL to the server, e.g., a particular device, a user identifier, data from a sensor, a location, a user interaction. The application sends data alphanumeric digits within the URL request. This is particularly important for in-store or in-mall applications where the ghost image or the ARE content (e.g., an AR video) may be changed and refreshed depending on the status of the device (e.g., a position and an orientation of the device, a device ID) or before, during, and after an event to change the content.

Using QR Code as a Secure Marketing Key

The present system and method uses a QR code or any other type of a 2D computer code as a secure marketing key, according to one embodiment. The present system and method secures and associates a unique and manageable AR data stream to any object that contains a printed or a displayed QR code. Packaging materials, print ads, promotional posters, and TV shows are increasingly using digital media and/or augmented reality (AR) to complement or augment user experience with a brand or a product that they promote. This creates an opportunity for digital media piracy to create competitive messages based on scene recognition with AR or URL rogue redirection. By associating an AR event to a QR code, the application provides a secure and trusted AR message to the user as well as the brand marketer.

After the application receives an acknowledgement of a positive target image lock on the QR code, if the device recognizes the server ID in the QR code, the devices makes an online request to the server to verify if the QR code is known and receive the associated content from a URL. The device also sends its identification information to the server. If the QR code is not recognized by the device or by the server, the device launches the browser and proceeds with the QR code URI as per standard QR code event management.

If the QR code is recognized by the server as a code that is generated by the present system and method, the server initiates the augmented reality event associated with the identified QR code. The server may find that the URL query from the application has a match with an existing URL on the server, or contains a code that is not generated by the present system and method. The URL query from the application to the server contains a set of alphanumeric digits that is partially encrypted with a share key (e.g., www.xxx.com/oiweubvp2oeinc2jnecp2nec2ec684e6c4w6e4c64ec6). Encryption of data with a share key is well known in the art. According to one embodiment, the present system and method routes the URL query to the server while the rest of the set may be encrypted for the present system and method.

Mobile User Interface Ergonomics for Augmented Reality Applications

The present system and method provides mobile user interface ergonomics for an augmented reality application using a 2D code (e.g., a QR code), according to one embodiment. The application in the user's device displays information for the user in a transparency layer to guide the user on subsequent steps to complete a mobile transaction.

The application displays data in a transparency layer projected in the camera preview of the device superposed with the real scene preview to guide the user on subsequent steps or targeting advice required for the application to perform successfully. The data displayed in the transparency layer may include graphical 2D information, data for a video or a still image, an actionable button, or any combination thereof. The user is able to see the real scene that is superposed with the data displayed in the transparency layer.

According to one embodiment, after an appropriate QR code recognition and association to a particular AR event, the AR event is started by the device and displayed in the camera preview. The camera preview displays instructions or possible action choices for the user.

Figure 3A:
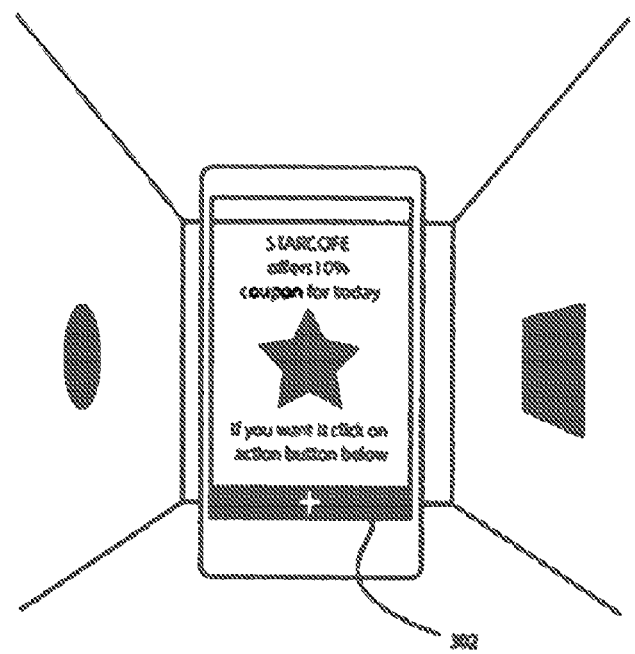
FIG. 3A illustrates an exemplary AR event, according to one embodiment.
Figure 3B:
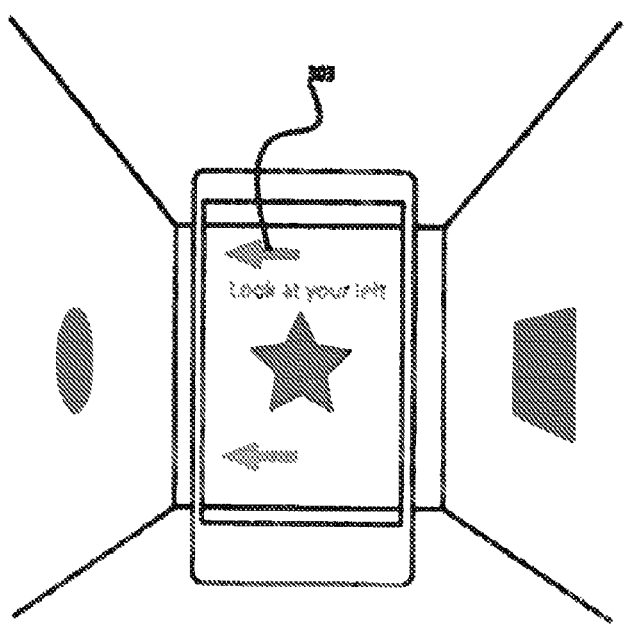
FIG. 3B illustrates another exemplary AR event, according to one embodiment.

FIG. 3A illustrates an exemplary AR event, according to one embodiment. When a user aims at a logo of a coffee shop and the ghost image of the coffee shop logo matches the live target, an AR event that offers a coupon starts on the application. The AR event includes an instruction for the user to select an action button 302. The user selects the action button 302 to redeem the 10% off coupon. FIG. 3B illustrates another exemplary AR event, according to one embodiment. The AR event 303 provides a direction towards a shop in a shopping mall.

Figure 4A:
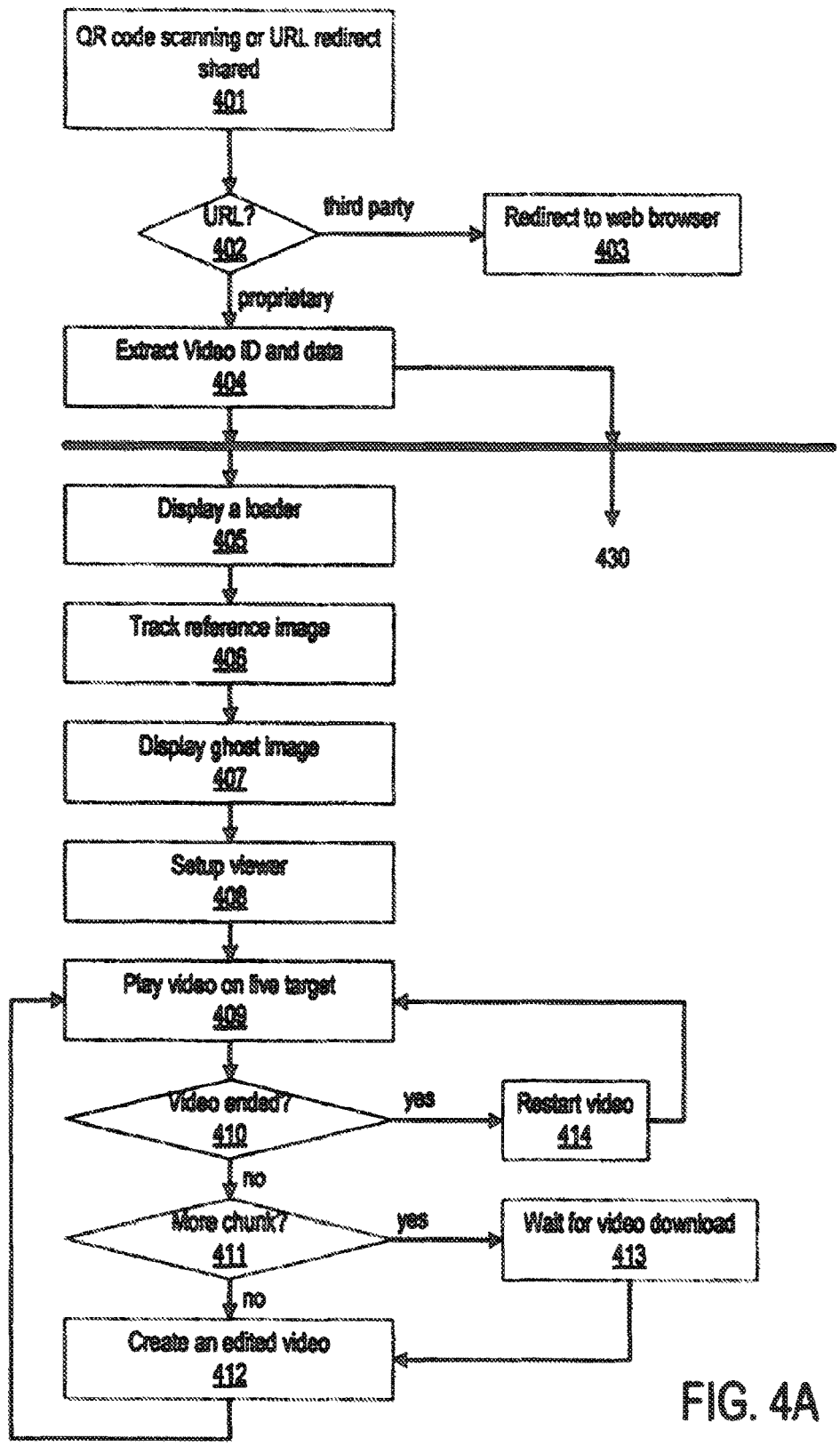
FIG. 4A and FIG. 4B illustrate an exemplary flow chart for providing an AR video to a user device, according to one embodiment.
Figure 4B:
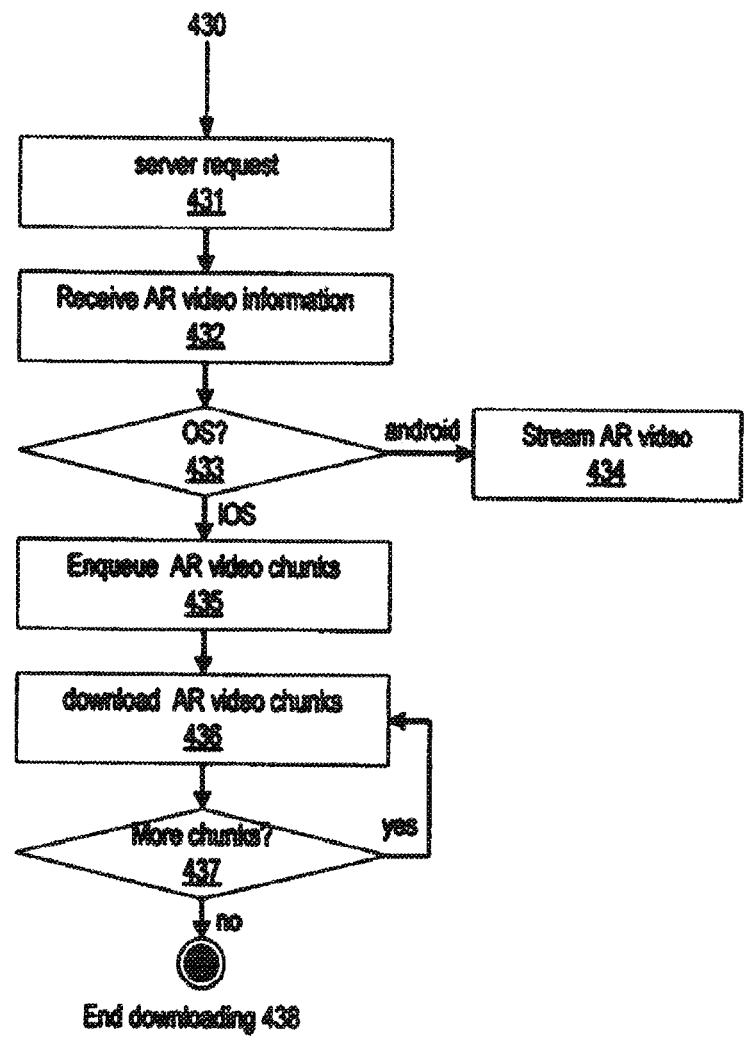

FIG. 4A and FIG. 4B illustrate an exemplary flow chart for providing an AR video to a user device, according to one embodiment. The application on the device performs or receives a scan of a QR code having a URL or a shared URL redirect (401). The application determines whether the URL is from a third party or a proprietary one (402). If the URL is from a third party, the application redirects the URL to a web browser of the device (403). If the URL is a proprietary one, the application extracts the video ID and associated data embedded in the URL (404).

After the video ID and associated data embedded in the URL is extracted, the application makes a request to a server (430). The application also displays a targeting advice area (e.g., loader) (405). The loader is superposed on the QR or a live target and is projected on a transparency layer on the geometrical space of the QR or the live target. For example, the loader is a 2D image or a movie. The loader is ready to be played or displayed on the user device. The application runs a tracker to track the reference image (406). When the tracker is ready, the application displays a picture of the live target (or a picture of a subset of the live target) such as a ghost image (407). When the reference image is detected in the real world as tracked in the camera flow, the application registers the reference image. The application sets up the viewer and determines the type of transparency (e.g., alpha left/green background) and the position of a 3D video (408).

The application plays the content on the reference image using 3D projection and transparency (409). When the video playing ends (410), the application determines whether there is another video chunk to download (411). When a subsequent video chunk is not downloaded yet, the application waits for the subsequent video chunk (413) and creates an edited video with the downloaded video chunk (412). After the video chunk is downloaded, if the application determines that the video chunk is the last one (410), the application restarts the video (414) and plays the video on the live target (409).

Referring to FIG. 4B, the server responds to the application's request (431) by obtaining the AR video information (432). The AR video information includes, but is not limited to, an AR video URL, a reference image or a ghost image, an AR video coordinate (x,y,z) with a relative position to the reference image, an AR video coordinate with reference to the QR code, the number of AR video chunks, ARE data, the type of AR video transparency (e.g., green chromakey, alpha left transparency). The server determines the OS of the user device (433). If the user device OS is ANDROID®, the AR video is streamed to the user device (434). If the user device OS is IOS®, the server enqueues AR video chunks (435) and downloads the AR video chunks to the user device (436). If the device determines that more video chunks are to be downloaded (437), the device continues to download the remaining video chunks to the user device until all AR video chunks are downloaded (438).

During the AR video event, the user may decide to take an action such as "like the application" or reporting of the application (e.g., inappropriate content), or switching to a menu that offers another action or another augmented reality session by displaying a picture of a different target image. The user may also take an action offered in the transparency layer of the AR video. When the AR video session is completed, the application may suggest a different set of actions by displaying a new user interface including a set of buttons/options within the transparency layer of the camera preview.

Streaming of Video to Mobile Device with an Alpha Channel

The present system and method streams a video to a mobile device with an alpha channel to provide a combining effect to the user, according to one embodiment. The video content is streamed to a mobile device (e.g., smartphone, tablet, AR glasses, and a mobile display device) with an alpha channel that adds a different level of transparency to the streaming video.

According to one embodiment, the present system and method builds a video (e.g., an alpha movie) that contains an original video (i.e., a content movie) and a mask video (i.e., mask movie) next to each other in the same frames. The alpha channel adds a different level of transparency to the original video for the mask movie so that some areas display content and some areas are transparent. For instance in the case of using black and white, the alpha channel is edited in a black and white movie, and the movie acts as a mask. In order to edit the mask movie into a grey scale, the following rules are applied:
1. White is transparent;
2. Black allows the pixel information to fully go through;
3. All greys between white and black are semi-transparent having a percentage of grey; colors going through grey mix with the background color at the same percentage as the grey scale that they go through; and
4. Black and white may be changed to any colors.

For example, yellow color going through a 50% grey is mixed with background color at 50%; and if the background color is blue, the color seen on screen is green color since combining yellow and blue colors results in green color. If yellow color goes through a black part of the alpha mask, the yellow color does not mix with the background color and continues to appear yellow on the screen, since all pixels go through black.

The mask movie has the same number of frames per second and the same size as the associated content movie. The mask movie is made to follow and interact with the content movie. The transformations are done on the colors in real time while the movie is playing on the device. Both the mask movie and the content movie are composed over one another in real time. The resulting combination is called an alpha movie. The alpha movie has content in certain areas and fully transparent in other areas. This creates augmented reality content in the camera preview of a mobile device. In the camera preview mode, the mobile device displays images of the real scene. The alpha movie information is streamed over a network as a normal movie. The application on the mobile device makes the composition in real time, frame by frame, of the content movie and the mask movie to add the transparency channel to the content movie. The movie plays with a transparent area over a live device camera view, superposing the alpha movie to the real scene. This way, augmented reality is created over the real scene on the display of the device.

According to one embodiment, the live camera preview of a device is aimed at a live scene, and the alpha movie is allowed to overlay a moving character in the scene. The present design can be applied to any device with a display capable of displaying content, for example, a real scene via a camera preview for a mobile device, a video effect, a 3D animation or a 3D effect of a real scene, and a video game.

Figure 5:
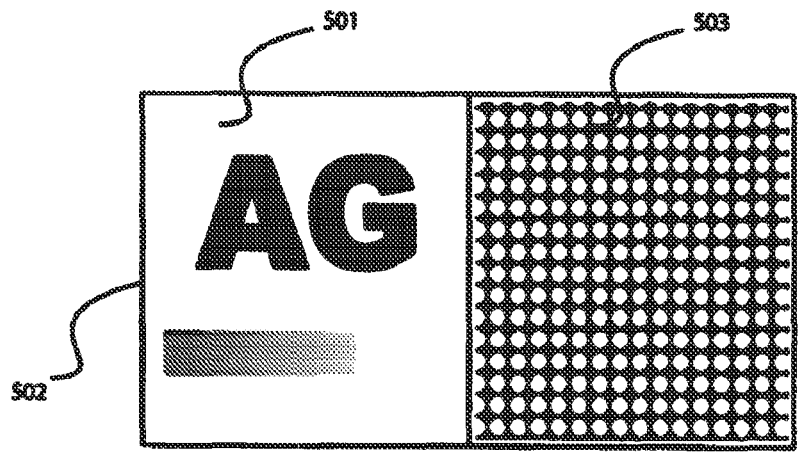
FIG. 5 illustrates an exemplary content with an alpha channel, according to one embodiment.
Figure 5:
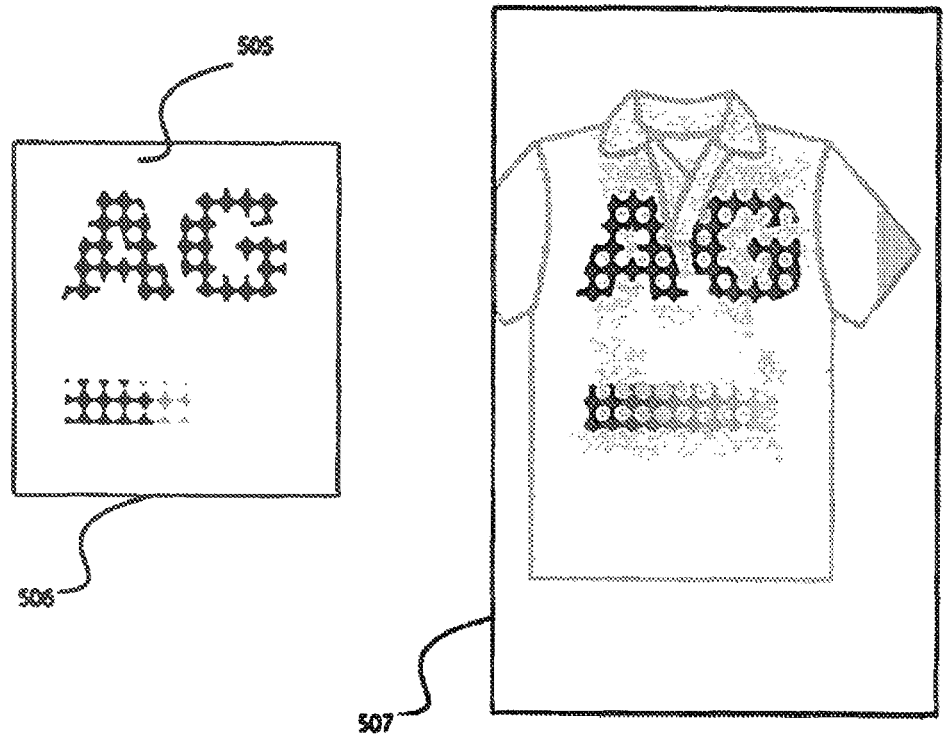

FIG. 5 illustrates an exemplary content with an alpha channel, according to one embodiment. Each of two separate videos 501 and 503 has the same length, size, and number of frames and they are associated together to get only one file. Video 501 is a mask movie that lets information go through the mask or blocks information. For instance, a mask movie is a black and white movie. The white section blocks information while the black section lets information go through the mask. Grey areas lets a certain percentage (e.g., 50%) of information go through. When the device plays a video, it superposes videos 501 to 503 on the fly while playing, creating the AR movie 506. In the AR movie 506, the white section 505 of the movie is blocking information of video 503, thus the AR movie in the white section 505 does not play the 503 movie and as a result is transparent if played in a transparency layer over the camera preview. In the black section of the video 501, the video 503 is visible as unmodified. In the grey section of the video 501, the AR movie 506 lets a percentage (e.g., 50%) of the pixels of the video 503 go through. If the AR video 506 is played in the transparency layer of the camera view over a reference image that is positioned and has been registered on a shirt, when aiming at the shirt, the AR video 506 is a transparent video that shows the shirt and video 503 only through the mask video 501 over the shirt.

Live Video Composition in Live Projection Matrix on a Mobile Device

The present system and method composes a live video in a live projection matrix on the display of a mobile device, according to one embodiment. The present system and method displays a live (or streamed) video content on a live projection matrix on a mobile device. The mobile device computes the coordinates of a reference image extracted from the camera's optical flow. The video is re-composed in real time to fit the coordinates, and provides the user the perception that the video is projected on the moving object in the 3D space of the real scene.

Figure 6A:
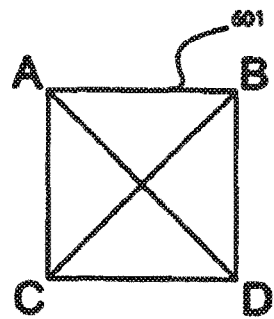
FIG. 6A illustrates an exemplary reference image, according to one embodiment.
Figure 6B:
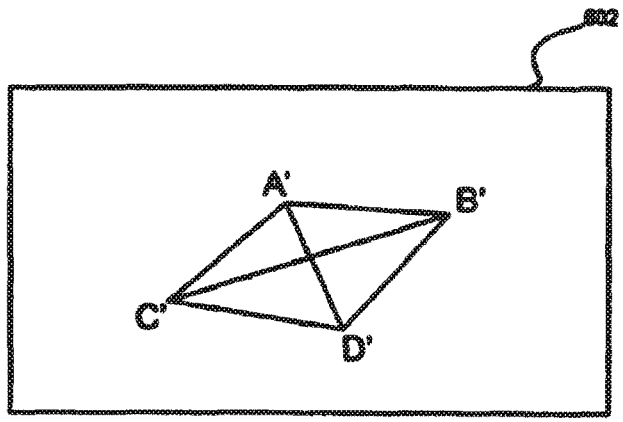
FIG. 6B illustrates an exemplary reference image in a different plane, according to one embodiment.

According to one embodiment, the present system and method provides an application for the mobile device to analyze each pixel in each frame of the optical flow from the camera preview. The application provides a reference image (an arranged pixel suite) to look for in the frames. In each frame, the application finds the reference image (an arranged pixels suite) in a geometric plane surface. If the reference image in the frame is not exactly in the 2D plane of the frame, the software uses projective geometry to find the reference image. FIG. 6A illustrates an exemplary reference image, according to one embodiment. In this example, the reference image is a square 601 with vertices A, B, C, and D. It is understood that any geographical shape other than a square may be used without deviating from the present subject matter. FIG. 6B illustrates the reference image of FIG. 6A shown in a different plane, according to one embodiment. The tilted square 602 with vertices A', B', C', and D' is in a different plane of one frame of the optical flow. When the reference image is found in a frame, the application performs a registration. During the registration, the application stores the coordinates of the geometric plane and the coordinates of the geometric projection on the frame associated to the frame number. The ensemble of all the frames and associated registered coordinates creates a live projection matrix. The application uses these coordinates to re-compose the content video frame by frame, pixel by pixel. For each frame, the content video is adjusted in size and its geometric plane is modified to match the geometric plane of the reference image.

Figure 7:
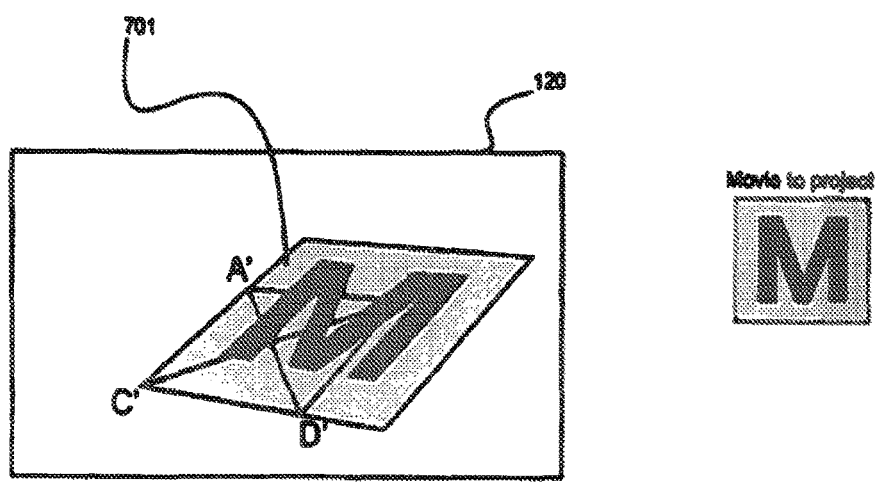
FIG. 7 illustrates an exemplary geometrical resizing and projection of a movie on a reference image plane, according to one embodiment.

An open graphics library (OpenGL) engine mathematically converts the size of the projection to fit the desired coordinates. The new converted size provides the coordinates of the video compared to the registered reference image in this plane. The conversion is performed by a projection matrix. According to one embodiment, an OpenGL from KHRONOS™ Group is used with hardware accelerated projective geometry to compute the video at the desired projection matrix size. The projection matrix is associated with the frame number. The video is overlaid on the live camera preview view display of the device in its projection matrix for each frame number. FIG. 7 illustrates an exemplary geometrical resizing and projection of a movie on the reference image plane, according to one embodiment. ABCD may be the section of a Package, or a section of an event ticket. The Augmented reality session consists of a movie M to be played specifically over the ABCD section of the object, and with a size ratio predefined as compared to the size of ABCD. The application considers a reference image ABCD. When the user looks or holds a package or a ticket in space, the application calculates the new coordinates A'B'C'D' of the reference image ABCD to project on the display of the application and registers the reference image in the A'B'C'D' plane. The application geometrically projects the movie M in the plane surface of A'B'C'D' and resizes it according to the specified ratio in the new plane to create and play the video 701 in a transparency layer over the camera preview of the real scene. The geometrical projection is repeated for each frame at a fast pace so that the video 701 is displayed on the display 120 of the device in real time. If ABCD is moving as the distance between the device 101 and the target changes (e.g., the user moves towards or away from the target within a certain boundary), the movie M is resized accordingly based on a predefined ratio with respect to the reference image.

The speed of finding the reference image in each frame during a registration event may be achieved by various techniques known in the art. These techniques may include analyzing only half of the frames, defining the reference image to have a small set of data to compare between optical flow and a defined reference image as the reference image may include sizeable data between each frame, and defining types of data in the reference image. According to one embodiment, a tracking image software development kit (SDK) provided by QUALCOMM® or METAIO® may be used. The reference image may be fed to the application as a binary set of data, according to one embodiment. A set of multiplier of the coordinates from an external data feed may be added to create further effects.

According to one embodiment, the display of a live content video on a live projection matrix is combined with a video content with an alpha channel (i.e., a transparent video) that is streamed to a mobile device to create an augmented reality event, or play movies in a 3D scene, or a video game.

Sharing Augmented Reality Experiences

The present system and method provides sharing of augmented reality experiences on a social network, according to one embodiment. The QR code can be replaced by a target picture so that a picture of the target image may reside in a list accessible within the application on the device, or may be sent in a social network, or via an SMS message or an email or a web application. The augmented reality experience may be shared using a mix technique. When the target picture is displayed as a button in a different web application, social network or messaging application, the user may select the target picture to start an augmented reality session. The application starts automatically and makes use of the ghost image associated with the target image and accesses the server via an embedded URL associated with the ghost image and target image (as if the corresponding QR code has been scanned). The list within the application on the users device may contain the user's past augmented reality sessions experienced. At any time, the user may select one of the past augmented sessions by clicking on the target picture associated to replay the session. The user may also share a current or past session via a message or a social network. The user may also experience a new session by selecting a target picture (e.g., a specific object, a landmark, a logo, a piece of art) or a theme (e.g., a stop sign, funniest videos, a brand) within a list of most viewed or most liked AR sessions.

According to one embodiment, the user receives an alert message on the device via various resources (e.g., push notification, social network, an email, an SMS message, notification resulting from one or any combination of location, a Wi-Fi network ID, a Bluetooth ID, and a phone ID). The alert message displays a picture of an image of a real scene, otherwise known as a target image. The user recognizes the image when he/she is in front of the real scene that matches the target image. The user launches the application by selecting the image in the message (e.g., from his social network application, an email, an OS alert). The application launches the camera preview, displays a ghost image of the target image (or a subset thereof), and advises the user to aim the camera of the device at the right scene. The application uses a reference image associated (which may be a mathematical representation of the target image) and performs image recognition to look for the target image in the camera flow. When the reference image is registered with the target image in the real scene, the augmented content is launched in the application. In one embodiment, a list of augmented content matching the target image is then downloaded from the server to the device. The list may be displayed in an arranged order. When the user is looking at the list, all target image pictures are seen as selectable items, with a title and comments, votes from all past user experience with the augmented reality. The arranged order may be from the first to the last, including, but is not limited to, any combination of close friends, a number of views, a number of and a type of pooling (e.g., 1 star, 5 stars, a like system), a theme, and paying customers.

The user selects the augmented content he/she wishes to experience. According to one embodiment, a user carries out an action after having experienced an augmented reality. Examples of user action include (1) adding comments (e.g., voting, a rating system, and a text), (2) sharing the augmented reality with others (e.g., via social network, an email, and a text message), (3) donating money to the author of the augmented content, (4) authoring an augmented reality content (e.g., drawing with a finger, adding content from a camera roll, and adding content from a set of editable content (3D) embedded in the application from an audio or video recording), (5) sharing the self-authored augmented reality content with others (e.g., via a social network, an email, and a text message), and (6) taking an action offered by the application (e.g., redeem a prize, a reward, and a coupon)

According to one embodiment, the user receives a target image of a stop sign. In the presence of a stop sign, the user selects the target image so that the application is launched and the ghost image associated (e.g., a stop sign in a transparency layer) is displayed to experience an augmented reality session. A list of content for the stop sign target image that includes augmented reality provided by other users, is also displayed to the user. The user can be notified of a nearby stop sign content based on the user location via a notification. The user chooses a desired augmented reality experience from the list. The user may comment, donate or share any of the augmented reality experience on the list. The user may also create his/her own augmented reality by capturing a picture or a video of the stop sign, or a person (or him/herself) or adding his own augmented content to the target image that was received. The user can create a target image, add augmented content from diverse sources including other users or own created content, and share the target image with others (e.g., via a message, sharing on a social network site, an application). The new target image is associated with a new URL with the new content although the picture of the target image and the ghost image may stay the same.

The above example embodiments have been described herein above to illustrate various embodiments of implementing a system and method for providing augmented reality on a mobile device has been disclosed. Various modifications and departures from the disclosed example embodiments will occur to those having ordinary skill in the art. The subject matter that is intended to be within the scope of the present disclosure is set forth in the following claims.

We claim:

1. A computer-implemented method, comprising:
providing a targeting advice area in a camera preview of an application running on a user device, the user device including one or more of a mobile phone and a tablet;
providing user interface suggestions in the targeting advice area to direct the user device to a target, wherein the user interface suggestions include one or more of directions, an arrow, symbols, text, pictures, diagrams, movies, and maps;
recognizing the target using the targeting advice area; and
providing content via the camera preview based on a target recognition, the content includes an animated character that behaves in response to a user's interaction with the user device, the user's interaction includes aiming at a live target in a real scene and providing a voice command.

2. The computer-implemented method of claim 1, wherein the target is a computer code selected from a group comprising a bar code, a matrix code, a flash code, a data matrix code, a quick response (QR) code, a MICROSOFT®, code, and a proprietary code.

3. The computer-implemented method of claim 1, further comprising sending QR code information associated with the target to a server based on a user's action as if a QR code has been scanned.

4. The computer-implemented method of claim 1, further comprising:
recognizing a uniform resource locator (URL) associated with the target;

making a web request to a server based on the URL; and
receiving an augmented reality event from the server based on the URL.

5. The computer-implemented method of claim 4, further comprising:
receiving a ghost image from the server, and
displaying the ghost image in a transparency layer of a camera preview to guide the user to aim at the target.

6. The computer-implemented method of claim 5, wherein the transparency layer for the camera preview includes a button or a user instruction.

7. The computer-implemented method of claim 5, wherein the ghost image is selected from a group comprising an outline of an object, a silhouette, a local environment view.

8. The computer-implemented method of claim 4, further comprising determining that the URL is recognizable by the application.

9. The computer-implemented method of claim 4, further comprising receiving an error message from the server if the URL is not recognizable by the server.

10. The computer-implemented method of claim 1, further comprising displaying a notification based on a location of the user device.

11. The computer-implemented method of claim 10, wherein the notification is triggered by the application if the user opens the application or the application runs in a wake-mode in an OS background of the user device.

12. The computer-implemented method of claim 10, wherein the location of the user device is provided by one or more of a GPS position data, Wi-Fi data, BTLE data, RFID or NFC tagging, audio signal, e-compass data, an accelerometer signal, and a gyroscope signal.

13. The computer-implemented method of claim 10, further comprising displaying the notification when the application is launched at the location.

14. The computer-implemented method of claim 13, wherein the application stores a list of locations to determine to display the notification.

15. The computer-implemented method of claim 1, wherein the user's interaction includes aiming at a target, a selection of a button, and a motion with the user device.

16. The computer-implemented method of claim 1, wherein the content is changed and refreshed depending on a status of the user device before, during, and after an augmented reality event.

17. The computer-implemented method of claim 1, further comprising:
identifying a reference image of the target;
determining a projection plane of the reference image in the camera preview by calculating a position, an orientation, and scaling of the reference image;
resizing the targeting advice area on the projection plane; and
projecting the content on the projection plane.

18. The computer-implemented method of claim 1, wherein the event is an augmented reality (AR) event.

19. The computer-implemented method of claim 18, wherein the AR event is selected from a group comprising a video, an audio, an instruction for a user action, web, a URL, a message, a telephone call, a logo, marketing material, a coupon, a purchase order, and a payment.

20. The computer-implemented method of claim 18, further comprising streaming a video of the augmented reality event from a URL of the target.

21. The computer-implemented method of claim 18, wherein the AR event includes a transparency video displayed in a transparency layer of a camera preview to provide an augmented reality over the real scene.

22. The computer-implemented method of claim 21, wherein the transparency video is selected from a group comprising a green chromakey, a chromakey movie, alpha left transparency, and an alpha movie.

23. A non-transitory computer readable medium containing computer-readable instructions stored therein for causing a computer processor to perform operations to:
provide a targeting advice area in a camera preview of an application running on a user device, the user device including one or more of a mobile phone and a tablet;
providing user interface suggestions in the targeting advice area to direct the user device to a target, wherein the user interface suggestions include one or more of directions, an arrow, symbols, text, pictures, diagrams, movies, and maps;
recognizing the target using the targeting advice area; and
provide content via the camera preview based on a target recognition, the content includes an animated character that behaves in response to a user's interaction with the user device, the user's interaction includes aiming at a live target in a real scene and providing a voice command.

24. The non-transitory computer readable medium of claim 23, wherein the computer-readable instructions stored therein for causing the computer processor to perform operations further to:
recognize a uniform resource locator (URL) associated with the target;
make a web request to a server based on the URL; and
receive an augmented reality event from the server based on the URL.

* * * * *